Sept. 15, 1970      G. P. BISHOP      3,529,278

ELECTRICAL CONNECTIONS

Filed July 11, 1968

INVENTOR
GRAHAM PAUL BISHOP
BY
ATTORNEYS 3,529,278
ELECTRICAL CONNECTIONS
Graham P. Bishop, Lewisham, England, assignor to Elliott Brothers (London) Limited, London, England, a British company
Filed July 11, 1968, Ser. No. 744,203
Claims priority, application Great Britain, July 14, 1967, 32,405/67
Int. Cl. H01r 19/40
U.S. Cl. 339—130                                              3 Claims

ABSTRACT OF THE DISCLOSURE

A cable connector for receiving and securing a cable, has a body of electrically insulative material having a cable receiving passage therethrough. One end portion of the passage tapers in the longitudinal direction of the cable. A sealing ring of elastomeric material and a washer through which a said cable can pass are located in the tapering portion of said passage. A lock nut is provided for urging the presser member against the sealing ring whereby, when a said cable is located in said passage the sealing ring is so compressed between the presser member and the wall of the tapering portion of the passage that that portion of the cable lying within the sealing ring is compressed radially inwardly.

---

The present invention relates to cable connectors and electrical connections.

The present invention provides a cable connector for receiving and securing a cable, said connector compris- a member of electrically insulative material having a cable receiving passage therethrough one end portion of the passage tapering in the longitudinal direction of the cable, a sealing ring of elastomeric material through which a said cable can pass and which is located in the tapering portion of said passage, a presser member having an opening therethrough through which a said cable can pass and which is located in a part of said tapering portion of said passage which is wider than that containing said sealing ring, and means for urging the presser member into contact with the sealing ring whereby, when a said cable is located in said passage, said sealing ring is so compressed between the presser member and the wall of the tapering portion of the passage that that portion of the cable lying within the sealing ring is compressed radially inwardly.

The present invention further provides a connector comprising an electrically insulative substantially cylindrical body member through which a passage extends, an electrically conductive member mounted in screw threaded engagement with the body member at one end thereof, said conductive member having an aperture therethrough for receiving an insulated electrical cable which will also extend into said passage, means operable, when the body member is located in an opening through a sheet of electrically conductive material, to clamp the connector to the conductive sheet whereby an electrically conductive portion of said clamping means makes electrical contact with said conductive sheet, and electrically conductive resilient means urging said electrically conductive member and the electrically conductive portion of the clamping means apart, whereby to electrically interconnect said conductive member and said conductive sheet.

An electrical connection including a connector will now be described, by way of example, with reference to the accompanying diagrammatic drawing in which.

Figure 1:
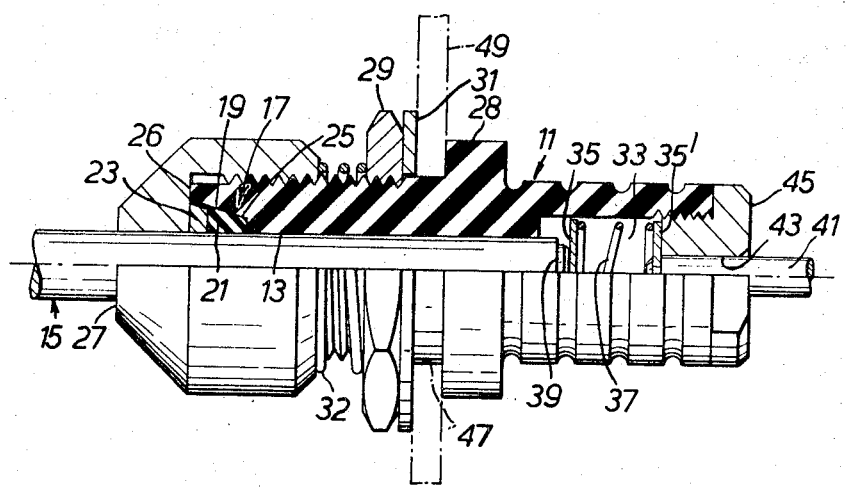
FIG. 1 shows a part-longitudinal section through a high tension electrical connection.
Figure 2:
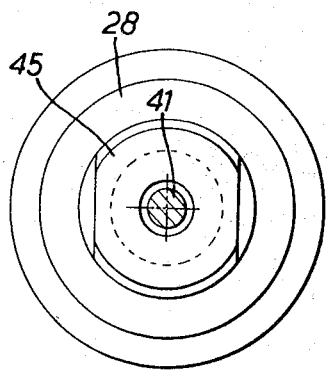
FIG. 2 shows one end elevation of FIG. 1.
Figure 3:
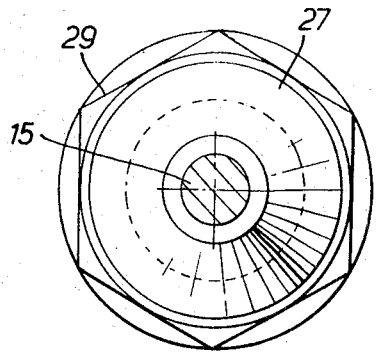
FIG. 3 shows the other end elevation of FIG. 1.

The connection has a generally cylindrical body 11 of electrically insulative material, e.g. Delrin (registered trademark) 150 or 500 series (Polyacetyl), through a passage 13 of which extends a cable 15. One end 17 of the passage 13 opens out so as to form a space 19 which surrounds the cable 15 and tapers in the longitudinal direction of the cable. There is a sealing ring 21 of elastomeric material, e.g. a cold cured silicon rubber, which surrounds the cable 15 and which is located in the tapering space 19. A brass presser member 23 surrounds the cable and exerts, on the ring 21, a pressure which acts in the longitudinal direction of the cable 15. The shape and size of the tapering space 19, the shape, size and hardness of the ring 21, and the resistance of the cable 15 to radial compression are such that, as a result of contact between the ring 21 and the wall 25 of the tapering space 19, under the pressure exerted by the presser member 23, the ring 21 is compressed, and, by its compression, compresses the cable 15 radially. The compression of the cable 15 substantially prevents the passage of ionized air or any other material which might affect the ability of the connection to withstand high voltages, the ring 21, itself, providing a seal against the passage of, e.g. ionized air, between the cable 15 and the wall of the passage 13.

The presser member 23 is actuable by an electrically conductive member, in the form of a conical nut 27, of aluminium alloy, which is threadingly connected to the body member 11. Axial movement of the nut 27 is limited by the end wall 26 of the body member 11. This prevents over compression of the sealing ring 21. The conical portion of the nut 27 supports the cable so as to prevent flexure of the cable in the region of the ring 21. Since it contacts the cable's insulative covering the nut is liable to accumulate electrical charge.

The body member 11 has an integral shoulder 28. The threaded portion of the body member carries a steel nut 29. Between the nut 29 and the shoulder 28, there is a steel washer 31 and, between the nut 29 and the nut 27 there is a beryllium copper spring 32.

Towards the end of the body member 11 remote from the nut 29, the passage 13 opens out so as to form a chamber 33. Within the chamber 33 there are a pair of metal washers 35, 35' which are urged apart by a beryllium copper spring 37.

At the inner end of the cable 15 the filamentary conductors of the cable are splayed out and soldered to a further metal washer 39. The spring 37 urges the washer 35 into electrical contact with the washer 39 and the washer 35' into electrical contact with the conductors of another cable 41 which extends into a pasage 43 of a member of e.g. Delrin having an externally threaded portion which threadingly engages an internally threaded portion of the body member 11.

In use, the body member 11 is located surrounded by the wall of an opening 47 in a metal sheet 49, through which the body member projects. The sheet 49 forms part of, e.g. a box or case containing electrical circuit components adapted to be fed, via the connection, from the cable 15.

The nut 29 bears against the washer 31 so that the metal sheet is tightly engaged on one surface around the opening 47 by the soulder 28 and on the opposite surface around the opening 47 by the washer 31. The spring 32 bears against the nuts 29 and 27 so as to provide a conduction path from the nut 27 to the metal sheet 49 and, from thence, to earth. The earthing of the nut 27 by means of the spring 32 ensures that no electrical charge builds up on the nut and in this way removes the hazard of electrical shock which might otherwise be received by an operator inadvertently coming into contact with the nut.

The box or casing, of which the metal sheet 49 forms part, is filled with a Silastomer (registered trademark) potting compound 51.

I claim:
1. A cable connector for receiving and securing first and second cables, said connector comprising:
- a member of electrically insulative material having an internal wall defining a cable receiving passage therethrough, said passage having first and second end portions, the second end portion of the passage being of enlarged cross-sectional area and receiving the first cable, and the second cable extending into the first end portion and projecting into the second end portion, the first end portion of the passage tapering in the longitudinal direction of the passage.
- first and second electrically conductive discs respectively electrically connected to said first and second cables,
- a spring extending between and in resilient engagement with said discs to electrically connect said discs,
- a sealing ring of elastomeric material located in the tapering portion of said passage,
- a presser member having an opening therethrough through which a cable can pass and which is located in a part of said tapering portions of said passage which is wider than that containing the sealing ring, and
- clamping means engaging said member of electrically insulative material and compressing the sealing ring between the cable and the internal wall of the tapering portion of the passage thereby also compressing the second cable radially inwardly.

2. A connector according to claim 1 wherein said clamping means comprises:
- a nut, said nut being arranged for engagement with a screw-threaded portion of said insulative body member, said body member having an external abutment, and
- a washer, the clamping of said sheet being achieved by said nut urging the washer towards said abutment so that portion of said sheet is trapped between said washer and said abutment.

3. In a connector for receiving and securing a cable and adapted for mounting on an electrically conductive sheet having a connector receiving aperture therein:
- an electrically insulative substantially cylindrical body member having a passage extending therethrough,
- an electrically conductive member mounted in screw threaded engagement with the body member at one end thereof, said conductive member having an aperture therethrough for receiving an insulated electrical cable which will also extend into said passage,
- clamping means having an electrically conductive portion clamping the connector to the conductive sheet, the electrically conductive portion of said clamping means making electrical contact with said conductive sheet, and
- electrically conductive resilient means urging said electrically conductive member and the electrically conductive portion of the clamping means apart, whereby to electrically interconnect said conductive member and said conductive sheet.

References Cited

UNITED STATES PATENTS

| | | | |
|---|---|---|---|
| 2,219,940 | 10/1940 | Ritz-Woller | 339—103 |
| 2,704,357 | 3/1955 | Johnson | 339—130 X |
| 3,187,292 | 6/1965 | Small et al. | 339—143 X |
| 3,307,138 | 2/1967 | Swartz | 339—103 X |
| 3,340,495 | 9/1967 | Weinschel | 339—177 |

RICHARD E. MOORE, Primary Examiner